(12) United States Patent
Park et al.

(10) Patent No.: US 9,568,735 B2
(45) Date of Patent: Feb. 14, 2017

(54) WEARABLE DISPLAY DEVICE HAVING A DETECTION FUNCTION

(71) Applicant: INDUSTRY-UNIVERSITY COOPERATION FOUNDATION HANYANG UNIVERSITY, Seoul (KR)

(72) Inventors: Jong-Il Park, Seoul (KR); Byung-Kuk Seo, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 870 days.

(21) Appl. No.: 13/873,617

(22) Filed: Apr. 30, 2013

(65) Prior Publication Data

US 2014/0043213 A1    Feb. 13, 2014

(30) Foreign Application Priority Data

Aug. 7, 2012   (KR) .................. 10-2012-0086484
Aug. 24, 2012  (KR) .................. 10-2012-0092937
Mar. 11, 2013  (KR) .................. 10-2013-0025711

(51) Int. Cl.
  *G02B 27/01*    (2006.01)
(52) U.S. Cl.
  CPC ......... *G02B 27/0176* (2013.01); *G02B 27/017* (2013.01); *G02B 2027/014* (2013.01); *G02B 2027/0138* (2013.01); *G02B 2027/0178* (2013.01)

(58) Field of Classification Search
  CPC .............. G02B 27/0176; G02B 27/017; G02B 2027/0138; G02B 2027/0178; G02B 2027/014
  See application file for complete search history.

(56) References Cited

U.S. PATENT DOCUMENTS 5,900,849 A    5/1999  Gallery
8,223,024 B1 * 7/2012  Petrou .................. G02B 27/017
                                      340/539.13
8,947,323 B1 * 2/2015  Raffle .................... G09G 3/001
                                      345/156
(Continued)

FOREIGN PATENT DOCUMENTS

JP    2005-252735 A    6/2005
JP    2006-146778 A    6/2006
(Continued)

*Primary Examiner* — Aneeta Yodichkas
(74) *Attorney, Agent, or Firm* — Ladas & Parry LLP

(57) ABSTRACT

A wearable display device equipped with a detection function is disclosed. The disclosed device includes an image viewer unit configured to show an image; a sensor unit configured to acquire a user's surrounding condition information; a determiner part configured to determine whether or not the user faces a dangerous condition based on information from the sensor unit; and an alarm information output part configured to output alarm information based on a determination result of the determiner part. The disclosed wearable display device makes it possible to increase the user's safety by effectively detecting dangerous objects, such as automobiles, and by suitably controlling the images on the device which may reduce the user's field of vision.

15 Claims, 7 Drawing Sheets

(56) References Cited

U.S. PATENT DOCUMENTS

| | | | | |
|---|---|---|---|---|
| 2006/0119539 A1* | 6/2006 | Kato | ................. | G02B 27/0176 |
| | | | | 345/8 |
| 2010/0177114 A1* | 7/2010 | Nakashima | .......... | G02B 27/017 |
| | | | | 345/589 |
| 2010/0259471 A1* | 10/2010 | Takano | ................ | G02B 27/017 |
| | | | | 345/156 |
| 2011/0249122 A1* | 10/2011 | Tricoukes | ............ | G02B 27/017 |
| | | | | 348/158 |
| 2013/0335301 A1* | 12/2013 | Wong | ................ | G02B 27/0093 |
| | | | | 345/8 |

FOREIGN PATENT DOCUMENTS

| JP | 2008-046557 A | 2/2008 |
|---|---|---|
| JP | 2008-230296 A | 10/2008 |

\* cited by examiner

WEARABLE DISPLAY DEVICE HAVING A DETECTION FUNCTION

CROSS-REFERENCE TO RELATED APPLICATIONS

This application claims the benefit of Korean Patent Applications Nos. 10-2012-0086484 (filed on Aug. 7, 2012), 10-2012-0092937 (filed on Aug. 24, 2012), and 10-2013-0025711 (filed on Mar. 11, 2013) filed with the Korean Intellectual Property Office. The disclosures of the above applications are incorporated herein by reference in their entirety.

BACKGROUND

1. Technical Field

The present invention relates to a wearable display device, more particularly to a wearable display device equipped with a detection function.

2. Description of the Related Art

The HMD (head-mounted display), a representative type of wearable display device, was designed to provide a pilot with aviation information such as the altitude, velocity, etc., of the aircraft. Commercial products were first developed during the 1990's, and have attracted interest after 1997 due to their popularity.

The HMD may be worn on the head like goggles and may provide the vision of a large screen showing virtual images. The display used here typically has a size of 1 inch or less, which may be magnified a hundredfold with the application of highly advanced optical technology.

With the development and commercialization of accessory devices such as the HMD, further growth is anticipated in the field of wearable computing devices. While previous efforts have focused on developing the HMD for movies or games, rapid advances in the fields of display devices and visual communication, as exemplified by the trends towards higher performance and smaller sizes in computer systems and LCD's, have led to research on wearable monitors, with some products already commercially available.

The HMD market faced many difficulties in the market for the past few years, due to relatively high prices, but the market is expected to grow dramatically in step with the trends in the wearable computer industry. The wearable HMD is expected to expand to industrial sites, logistics warehouses, maintenance sites for large-scale equipment such as cars, airplanes, and ships, etc., as well as to the field of sports entertainment, such as car racing.

In particular, developments in processor and software technology enable the miniaturization of computing devices, and as such, the HMD is expected to evolve beyond simply displaying images to becoming a personal computing device analogous to the smart phone.

If an HMD is utilized as a personal computing apparatus, it can be expected to be used in indoor as well as outdoor environments. However, as the display of the HMD has a considerable impact on one's field of vision, it may also have an influence on the safety of the user.

For example, if the HMD is worn by a user walking along a street, the display of the HMD can prevent the user from recognizing cars or other dangerous objects which may suddenly appear, posing a considerable risk to the user's safety.

SUMMARY

An aspect of the invention is to propose a wearable display device that can be safely used even in an outdoor environment.

Also, an aspect of the invention is to propose a wearable display device that can increase the user's safety by effectively detecting dangerous objects such as automobiles.

Another aspect of the invention is to propose a wearable display device that increases the user's safety by suitably controlling the images on the device which may reduce the user's field of vision.

One aspect of the invention provides a wearable display device that includes: an image viewer unit configured to show an image; a sensor unit configured to acquire a user's surrounding condition information; a determiner part configured to determine whether or not the user faces a dangerous condition based on information from the sensor unit; and an alarm information output part configured to output alarm information based on a determination result of the determiner part.

The wearable display device may further include a function limiter part, which may deactivate a particular function based on the determination result of the determiner part.

The determiner part may include a dangerous object detector part, which may determine whether or not a dangerous object exists in the user's surroundings.

The dangerous object detector part may include an object feature analyzer part, which may determine whether or not a detected object is a dangerous object; an object velocity analyzer part, which may analyze a velocity of a detected object; and an object direction analyzer part, which may analyze a movement direction of a detected object.

The detector part may further include an environment determiner part configured to determine whether or not the user is located indoors.

The determiner part may further include a movement detector part configured to detect a movement speed of the user.

The environment determiner part may determine whether or not the user is located indoors by using at least one of illuminance, light wavelength, temperature, GPS reception rate, and presence of a particular radio signal or a combination thereof.

The dangerous object detector part may be deactivated if the user is located indoors or if a movement speed of the user is greater than or equal to a preset threshold speed.

The function limiter part may deactivate a particular function after the alarm information is outputted, if a danger condition is not resolved after a preset amount of time has passed.

The function limiter part may stop showing an image shown on the image viewer unit or may reduce the size of the image to a preset size or smaller.

Another aspect of the invention provides a wearable display device that includes: an image viewer unit configured to show an image; a sensor unit configured to acquire condition information regarding the wearable display device; a motion detector part configured to detect a movement speed of a user based on information from the sensor unit; and a function limiter part configured to stop showing an image shown on the image viewer unit or reduce a size of the image to a preset size or smaller if the movement speed of the user is greater than or equal to a threshold speed.

Still another aspect of the invention provides a method of controlling a wearable display device for providing a user with an image that includes: (a) acquiring the user's surrounding condition information; (b) determining whether or not the user faces a dangerous condition based on information acquired in said step (a); and (c) outputting alarm information based on a determination result of said step (b).

Yet another aspect of the invention provides a method of controlling a wearable display device for providing a user with an image that includes: (a) acquiring the user's surrounding condition information; (b) determining whether or not the user faces a dangerous condition based on information acquired in said step (a); and (c) deactivating a particular function based on a determination result of said step (b).

Certain embodiments of the invention make it possible to safely use the wearable display device even in an outdoor environment.

Also, certain embodiments of the invention can increase the user's safety by effectively detecting dangerous objects, such as automobiles, and by suitably controlling the images on the device which may reduce the user's field of vision.

Additional aspects and advantages of the present invention will be set forth in part in the description which follows, and in part will be obvious from the description, or may be learned by practice of the invention.

DETAILED DESCRIPTION

Figure 1:
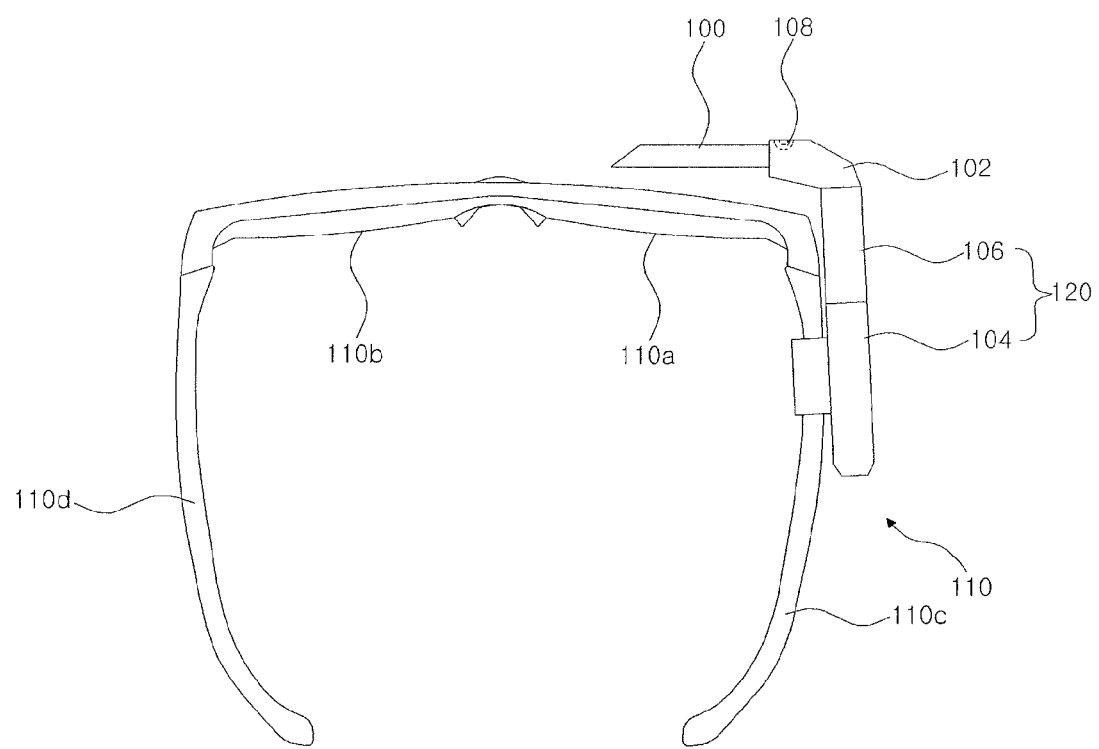
FIG. 1 illustrates an example of a wearable display device according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

FIG. 1 illustrates an example of a wearable display device according to an embodiment of the invention.

Referring to FIG. 1, a wearable display device according to an embodiment of the invention can include an image viewer unit 100, a connection unit 102, a main unit 120 that includes an interface unit 104 and a processor unit 106, a sensor unit 108, and a frame 110.

The frame 110 may form the main body of the wearable display device and can have a structure similar to that of a pair of glasses, for example, as illustrated in FIG. 1. The frame may be structured to be wearable on a user's head, and other components of the wearable display device may be coupled onto the frame 110.

The frame 110 can be made from various materials including metals and dielectrics, but using a dielectric material can be considered so as not to influence computing operations and RF signal reception.

While FIG. 1 illustrates an example in which the frame is of a similar form to that of a pair of glasses, the frame 110 can take any form that is wearable on the user's body. For instance, the frame can take the form of a helmet or a set of headphones.

In cases where the frame has a form similar to a pair of glasses, an example of which is illustrated in FIG. 1, the frame may include two lens-mounting parts 110a, 110b. A user who needs prescription glasses can mount lenses onto the lens-mounting parts 110a, 110b for use.

Also, the frame 110 may include two support parts 110c, 110d for wearing the frame on the user's ears.

The main unit 120 may include an interface unit 104 and a processor unit 106. The interface unit 104 and processor unit 106 can each be included in a separate housing or can be implemented in a single integrated form.

The interface unit 104 may serve to receive control information from the user and provide it to the processor unit 106. The interface unit 104 may receive control information for turning the power on or off, as well as information for controlling the overall operation of the wearable display device, from the user. For example, various control commands such as for playing a video clip, making a voice call, searching information, etc., can be provided through the interface unit.

The interface unit 104 can be implemented in various forms. For example, it is possible to provide control information through a number of buttons, and it is also possible to provide a flat interface such as that for a mouse controller on a laptop.

The processor unit 106 may serve to control the operations of the wearable display device according to an embodiment of the invention.

The processor unit 106 and the interface unit 104 may be connected by a cable or some other electrical connection means in order to exchange electrical signals. The user's control information transferred from the interface unit 104 may be received by the processor unit 106, which may then process the user's request.

The image viewer unit 100 may provide the user with image information by showing images. The image viewer unit 100 may be installed in front of the user's eye. The connection member 102 may connect the main unit 120 with the image viewer unit 100 such that the image viewer unit 100 is fixed in front of the user's eye.

The connection member 102 can be shaped as an "L", and due to this structure, the main unit 120 may be coupled parallel to a support part 110c of the frame 110, while the image viewer unit 100 may be disposed orthogonally to the support parts 110c, 110d of the frame 110.

The connection member 102 can encase several cables for providing image control signals from the processor unit 106 to the image viewer unit 100.

The image viewer unit 100 can have a size of about 1 inch in the form of a micro-display and can show images using various known methods. It may be preferable to have the image viewer unit 100 made of a transparent material, so as not to obstruct the user's field of vision when there is no image being shown, but it is also possible to use an image viewer unit that does obstruct the field of vision.

In order to show an image on the image viewer unit 100, an external light source can be used, or a self-illuminating system can be used.

An example of using a self-illuminating system is to use OLED's. An OLED contains electrons and holes, which undergo an excitation state and then recombine to produce light. As it can emit light by itself, it is possible to show images without a separate external light source.

An example of using a system with an external light source is to use a transparent display. One such example is the TFT-LCD, which is structured such that light emitted from a fluorescent lamp is directed towards a liquid crystal panel by a device that reflects and disperses the light. The liquid crystal panel includes twisted nematic (TN) liquid crystals filled in between two glass sheets; the glass sheet on the side where light enters includes TFT and ITO pixels and a liquid crystal alignment layer, while the glass sheet on the other side is structured with a color filter and a coated liquid crystal alignment layer (polyimide).

Another example of using a system with an external light source is to use a reflective display. One example of a reflective display is the LCos, in which light is reflected with a reflective display to show images. A silicon substrate is mainly used for the display element, and it is possible to show images of a high resolution on a small display screen.

Figure 10:
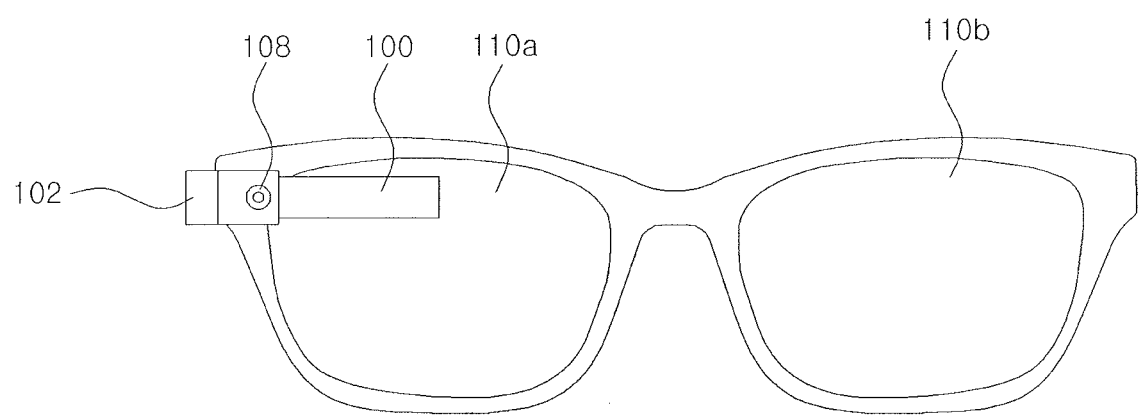
FIG. 10 is a front view of a wearable display device according to an embodiment of the invention.

The sensor unit 108 may acquire information regarding the user or the user's surrounding conditions. FIG. 10 is a front view of a wearable display device according to an embodiment of the invention, and as illustrated in FIG. 10, the sensor unit can be installed at the front of the frame to acquire information on the surrounding conditions. A first sensor unit 108 may be to acquire image information of the user's surroundings. The information on the user's surroundings may be acquired in order to detect dangerous objects. Here, a dangerous object refers to a fast-moving object such as a car, etc., which can threaten the user's safety.

The sensor unit 108 can acquire image information of the surroundings by using an image sensor such as a camera. To acquire image information for a larger scope, the sensor unit 108 can include a camera that uses a wide-angle lens or a camera capable of capturing panorama images.

A second function of the sensor unit 108 may be to detect environment information of the surroundings, such as illuminance and temperature. The detection of the environment information of the surroundings such as illuminance can be used to determine whether the user is in an indoor environment or an outdoor environment.

A third function of the sensor unit 108 may be to detect a movement speed of the user. The sensor unit 108 can employ an acceleration sensor, etc., to detect the movement speed of the user.

The sensor unit 108 can include a multiple number of sensors to perform the first to third functions described above.

It may be advantageous to dispose the sensor unit 108 at a position near the image viewer unit 100 in order to effectively detect dangerous objects present in the user's surroundings. For instance, the sensor unit 108 can be coupled to the connection unit 102.

The processor unit 106 may analyze the detection information acquired by the sensor unit 108 to determine whether or not the user faces a dangerous condition. The processor unit 106 may analyze the image information acquired by an image sensor included in the sensor unit 108, for example, to determine whether or not there is a dangerous object in the surrounding area and whether or not the dangerous object is approaching the user at a high speed.

If it is determined that a dangerous object is approaching the user, the processor unit 106 may output a preconfigured set of alarm information or limit the functions of the wearable display device. Of course, the outputting of alarm information and the limiting of functions can be performed concurrently. As an example of limiting a function, an operation of stopping the display of an image or reducing the size of the image may be performed, in order that the image may not obstruct the user's field of vision. Examples of an image that may be stopped or reduced can include a video conference call image or a video clip being played.

Also, the processor unit 106 may analyze the surrounding environment information, as detected by the sensor unit 108, to determine whether the user is located indoors or outdoors. If the user is located indoors, the function for detecting whether or not a dangerous object is approaching and the function for outputting alarm information could be deactivated in order to reduce battery consumption. Of course, the function of detecting danger to limit certain functions or output alarm information can also be deactivated at will by the user.

Also, the processor unit 106 may determine the movement speed of the user based on the detection results of the sensor unit 108, and the user's movement speed can be utilized as supplementary information in determining whether or not to activate the function for detecting the approach of dangerous objects.

For instance, the processor unit 106 may determine whether or not a dangerous object is approaching that could impact the safety of the user and may output alarm information to the user or limit the image display function. Also, this detection function may preferably be deactivated if the user is located indoors or is not moving, so as to conserve resources and battery power.

According to another embodiment of the invention, the alarm information can be outputted or certain functions can be limited also in cases where the movement speed of the user exceeds a preset threshold.

Figure 2:
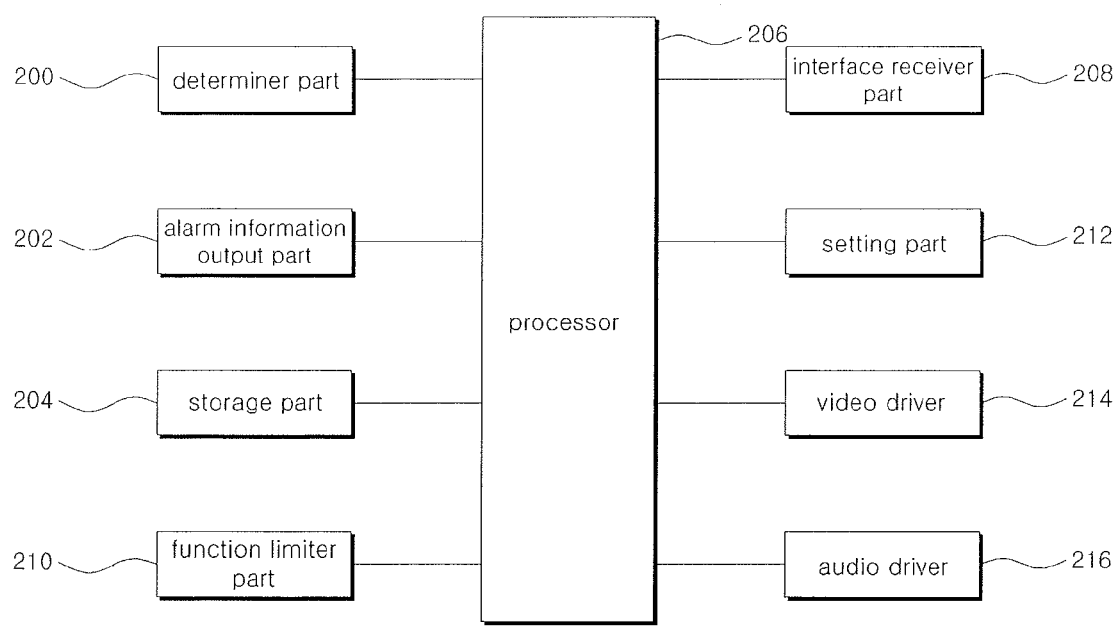
FIG. 2 is a block diagram illustrating the modular composition of a processor unit in a wearable display device according to an embodiment of the invention.

FIG. 2 is a block diagram illustrating the modular composition of a processor unit in a wearable display device according to an embodiment of the invention.

Referring to FIG. 2, the processor unit 106 of a wearable display device according to an embodiment of the invention may include a determiner part 200, an alarm information output part 202, a storage part 204, a processor 206, an interface receiver part 208, a function limiter part 210, a setting part 212, a video driver 214, and an audio driver 216.

The determiner part 200 may determine whether or not a dangerous object approaches the user by using the information acquired at the sensor unit 108. Also, the determiner part 200 may determine whether or not the user is located indoors and whether or not the user is moving at or above a preset threshold speed.

Figure 3:
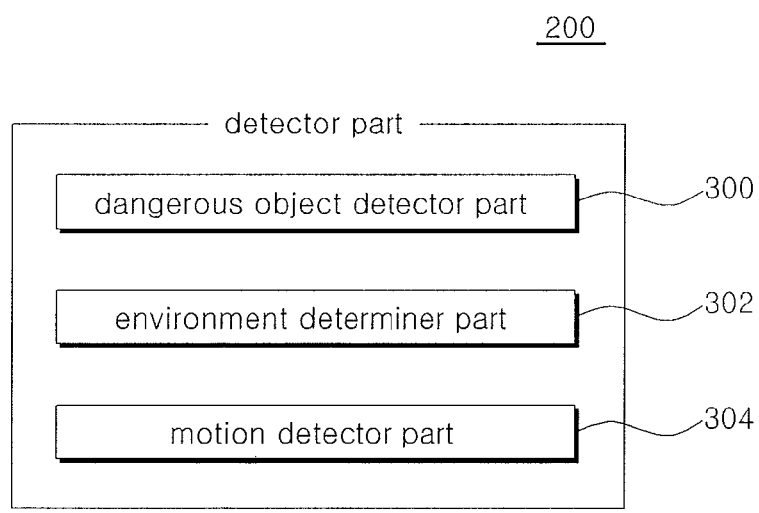
FIG. 3 is a block diagram illustrating the modular composition of a determiner part according to an embodiment of the invention.

FIG. 3 is a block diagram illustrating the modular composition of a determiner part according to an embodiment of the invention.

Referring to FIG. 3, a determiner part 200 according to an embodiment of the invention may include a dangerous object detector part 300, an environment determiner part 302, and a motion detector part 304.

The dangerous object detector part 300 may analyze the information outputted from the sensor unit 108 to determine whether or not a dangerous object approaches the user. The dangerous object detector part 300 can determine whether or not a dangerous object approaches the user by analyzing image information provided from the sensor unit 108.

Figure 4:
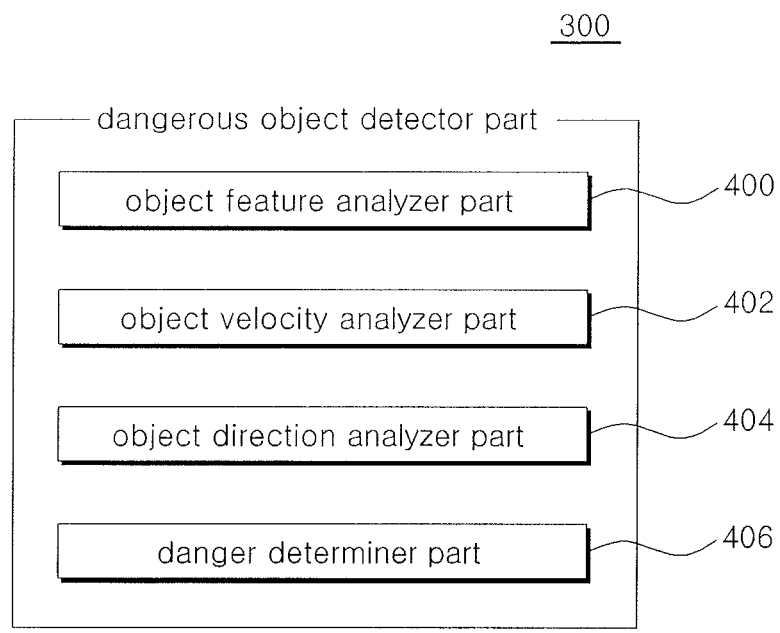
FIG. 4 is a block diagram illustrating the modular composition of a dangerous object detector part according to an embodiment of the invention.

FIG. 4 is a block diagram illustrating the modular composition of a dangerous object detector part 300 according to an embodiment of the invention.

Referring to FIG. 4, a dangerous object detector part 300 according to an embodiment of the invention can include an object feature analyzer part 400, an object velocity analyzer part 402, an object direction analyzer part 404, and a danger determiner part 406.

The object feature analyzer part 400 may analyze images obtained at the sensor unit 108 to determine whether or not an object exists that corresponds to a dangerous object. The information on the features of a dangerous object can be learnt beforehand, and the object feature analyzer part 400 may determine whether or not an object corresponding to a dangerous object feature learnt beforehand exists in the acquired images. Here, an object feature can include an object's shape information, color information, and the like.

The object feature analyzer part 400 can determine whether or not a dangerous object exists in the acquired images by comparing the features of objects existing in the acquired images with the features of objects learnt beforehand. The method of comparing object features is well known in the art and thus will not be elaborated here.

The object velocity analyzer part 402 may serve to analyze the movement speeds of dangerous objects captured as images. Image information can be used for the velocity analysis can utilize, while a separate radar or ultrasonic sensor, etc., can also be used.

The object direction analyzer part 404 may serve to analyze the movement directions of moving objects. The analysis of an object's direction can be performed by using the image information.

The danger determiner part 406 may use the information analyzed by the object feature analyzer part 400, object velocity analyzer part 402, and object direction analyzer part 404 to determine whether or not the user faces a dangerous condition.

In FIG. 4, the danger determiner part 406 may determine whether or not the user faces a dangerous condition by considering the features, velocities, and directions of objects. The determining of whether or not there is a dangerous condition can be based on various conditions. For instance, the danger determiner part 406 can determine that the user is in danger regardless of the speed or direction of an object if an object exists which was learnt beforehand as a dangerous object. Conversely, it can also be determined that the user is in danger only when the dangerous object is approaching in the direction of the user at a speed higher than or equal to a threshold speed.

In another example, even if there is no object present that was learnt beforehand as a dangerous object, it can be determined that the user is in danger if a particular object approaches in the direction of the user at a speed higher than or equal to a threshold speed. In still another example, if a particular object is detected as moving in the user's direction, it can be determined that the user is in danger regardless of whether or not the object is a dangerous object and regardless of its speed.

The environment determiner part 302 may serve to detect whether the environment in which the user is located is outdoors or indoors.

Figure 5:
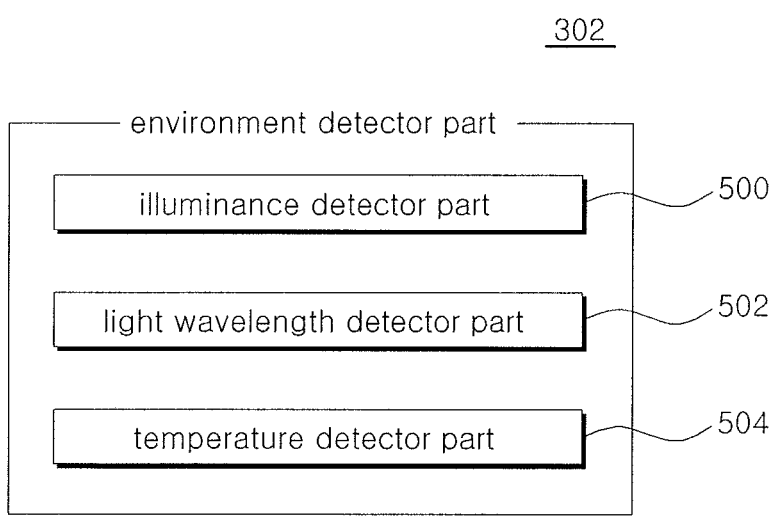
FIG. 5 is a block diagram illustrating the modules of an environment detector part according to an embodiment of the invention.

FIG. 5 is a block diagram illustrating the modules of an environment detector part according to an embodiment of the invention.

Referring to FIG. 5, an environment determiner part 302 according to an embodiment of the invention can include an illuminance detector part 500, a light wavelength detector part 502, and a temperature detector part 504.

The illuminance detector part 500 may detect the illuminance at the location where the user is present, and the light wavelength detector part 502 may detect the wavelengths of the lighting at the location where the user is present, while the temperature detector part 504 may detect the temperature at the location where the user is present. The illuminance, light wavelengths, and temperature can be acquired using known types of sensors.

The environment determiner part 302 may determine whether or not the user is located indoors by using the illuminance, light wavelength, and temperature information. Of course, the environment determiner part 302 can determine whether or not the user is located indoors by using the above types of information selectively, or also by using additional information. For example, the environment determiner part 302 can determine that the user is indoors if the illuminance is within a preset illuminance range and the wavelengths of the lighting are within a preset range.

Unlike the example shown in FIG. 5, the environment determiner part 302 can also determine whether or not the user is indoors by using radio signals. For example, if the user is indoors so that the reception rate of a GPS signal is equal to or lower than a threshold value, then the environment detector part 302 can determine that the user is located indoors. Alternatively, the environment detector part 302 can determine whether or not it is located indoors based on whether or not certain radio signals are received. For example, it is possible to determine whether or not the user is indoors based on whether or not certain radio signals are received from RFID or NFC modules installed indoors.

Of course, the environment determiner part 302 can also determine whether or not the user is located in an indoor environment by comprehensively considering the illuminance, light wavelengths, temperature, GPS reception rate, and reception of certain radio signals such as RFID or NFC signals.

The motion detector part 304 may determine the movement speed of the user by using the acceleration information detected from the sensor unit. Alternatively, the motion detector part 304 can also determine the movement speed of the user by using GPS signals.

The motion detector part 304 may determine that the user faces a dangerous condition if the movement speed of the user is greater than or equal to a preset threshold value.

The alarm information output part 202 may serve to output alarm information if it is determined at the determiner part 200 that the user is in danger. The alarm information output part 202 can output the alarm information in audio or video form.

For instance, the alarm information output part 202 can notify the user of a dangerous condition by outputting a sound that signaling danger, and as another example, the alarm information output part 202 can notify the user of a dangerous condition by displaying alarm information on the image viewer unit.

The alarm information output part 202 may provide control information to the video driver 214 or the audio driver 216 in order that a preconfigured set of alarm information may be outputted in audio or video form. Of course, the alarm information can be outputted simultaneously in audio and video form.

Figure 6:
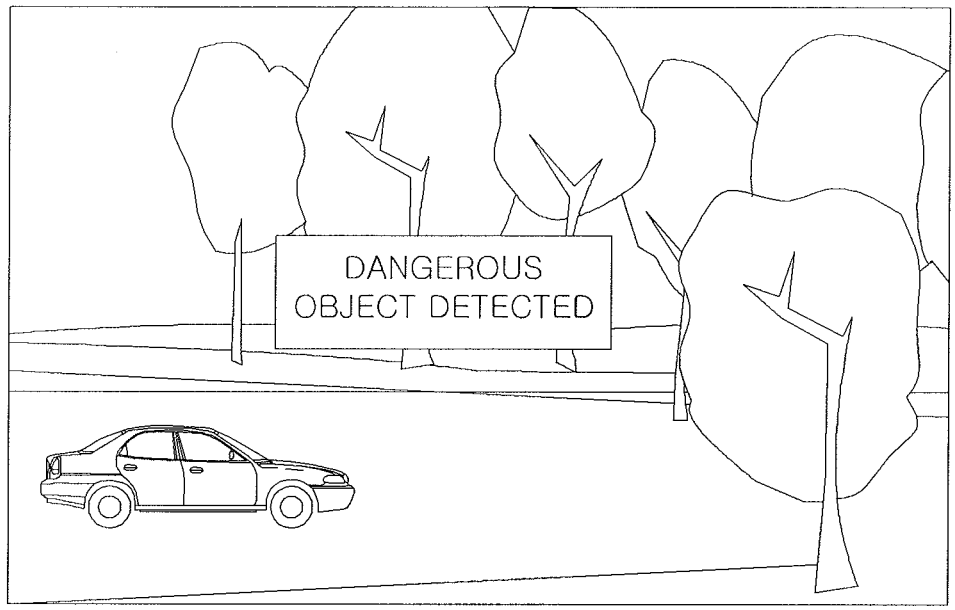
FIG. 6 illustrates an example of outputting alarm information in video form according to an embodiment of the invention.

FIG. 6 illustrates an example of outputting alarm information in video form according to an embodiment of the invention.

Referring to FIG. 6, the alarm information can be displayed in the form of the message "DANGEROUS OBJECT DETECTED" as an overlay on the image being shown. By thus displaying alarm information, the user can recognize a dangerous condition and stop the use of the wearable display.

The alarm information can also be outputted when the user is moving at a high speed and may thus be prone to danger in the future. That is, if the user's movement speed is greater than or equal to a preset threshold speed, alarm information can be outputted in audio or video form.

Figure 7:
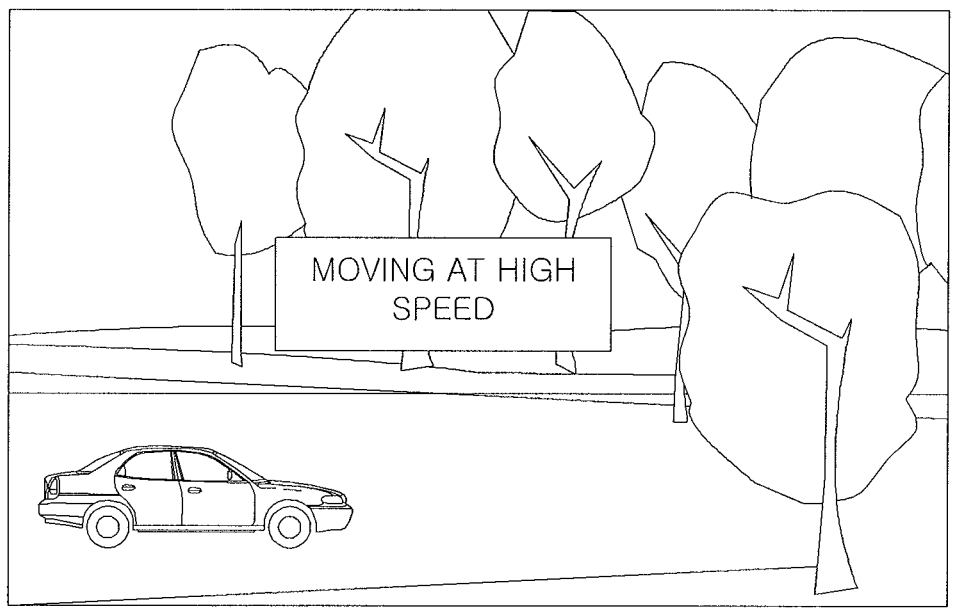
FIG. 7 illustrates an example of outputting an alarm message regarding a movement speed according to an embodiment of the invention.

FIG. 7 illustrates an example of outputting an alarm message regarding a movement speed according to an embodiment of the invention.

Referring to FIG. 7, an alarm message reading "MOVING AT HIGH SPEED" can be shown as an overlay on the originally shown image.

The function limiter part 210 may limit the functions of the wearable display device if it is determined that the user faces a dangerous condition. For instance, the function limiter part 210 can limit the functions of the wearable display device, deactivating the image viewer function of the image viewer unit 100 such that no images are shown. Alternatively, the viewing size of the image can be reduced such that it does not obstruct the user's field of vision.

The function limiter part 210 could also limit the audio output function if it is determined that the user faces a dangerous condition.

The function limiter part 210 can operate such that certain functions of the wearable display device are deactivated if the danger condition for the user is not resolved even after the alarm information is outputted.

Alternatively, the function limiter part 210 can also deactivate certain functions of the wearable display device immediately after outputting the alarm information.

In another example, certain functions of the wearable display device can be deactivated by way of the function limiter part 210 but with the output of alarm information omitted. An example of a case in which the output of alarm information may be omitted is when it is determined that a dangerous object is approaching at a very high speed and the danger level for the user is very high. In this case, the output of alarm information can be omitted, and certain functions can be deactivated immediately.

The setting part 212 may serve to configure the activation/deactivation settings for the function of detecting and outputting danger information. As the function for detecting and outputting danger information may require a considerable amount of power, the setting part 212 may deactivate this function of detecting and outputting danger information under certain circumstances, in order to increase the battery use efficiency.

According to an embodiment of the invention, the setting part 212 may deactivate certain functions in response to the user's control command. For instance, the user may be provided with an interface for activating/deactivating the dangerous object detection function according to an embodiment of the invention, and if a control command for deactivating the detector function is selected by way of the interface, the setting part 212 may deactivate the detector function. Also, the functions for outputting alarm information and for limiting certain functions could also be activated/deactivated.

According to another embodiment of the invention, the setting part 212 can deactivate certain functions by using the detection information of the determiner part 200. For example, the setting part 212 can deactivate the dangerous object detection function if the determiner part 200 determines that the user is located indoors. In another example, the setting part 212 can deactivate the dangerous object detection function if the determiner part 200 determines that the user's movement speed is equal to or lower than a preset threshold speed. Also, the alarm output function and function-limiting function could be deactivated if it is determined that the user is located indoors or is not moving.

The interface receiver part 208 may be electrically coupled with the interface unit to receive the user's interface commands.

The storage part 204 may serve to store programs for operating the wearable display device according to an embodiment of the invention as well as user data.

The video driver 214 may serve to generate information for outputting the images shown on the image viewer unit, and the audio driver 216 may serve to generate audio signals. The video driver 214 and the audio driver 216 can output alarm information according to the control of the alarm information output part 202. Also, the operations of the video driver 214 and audio driver 216 can be deactivated according to the control of the function limiter part 210.

Figure 8:
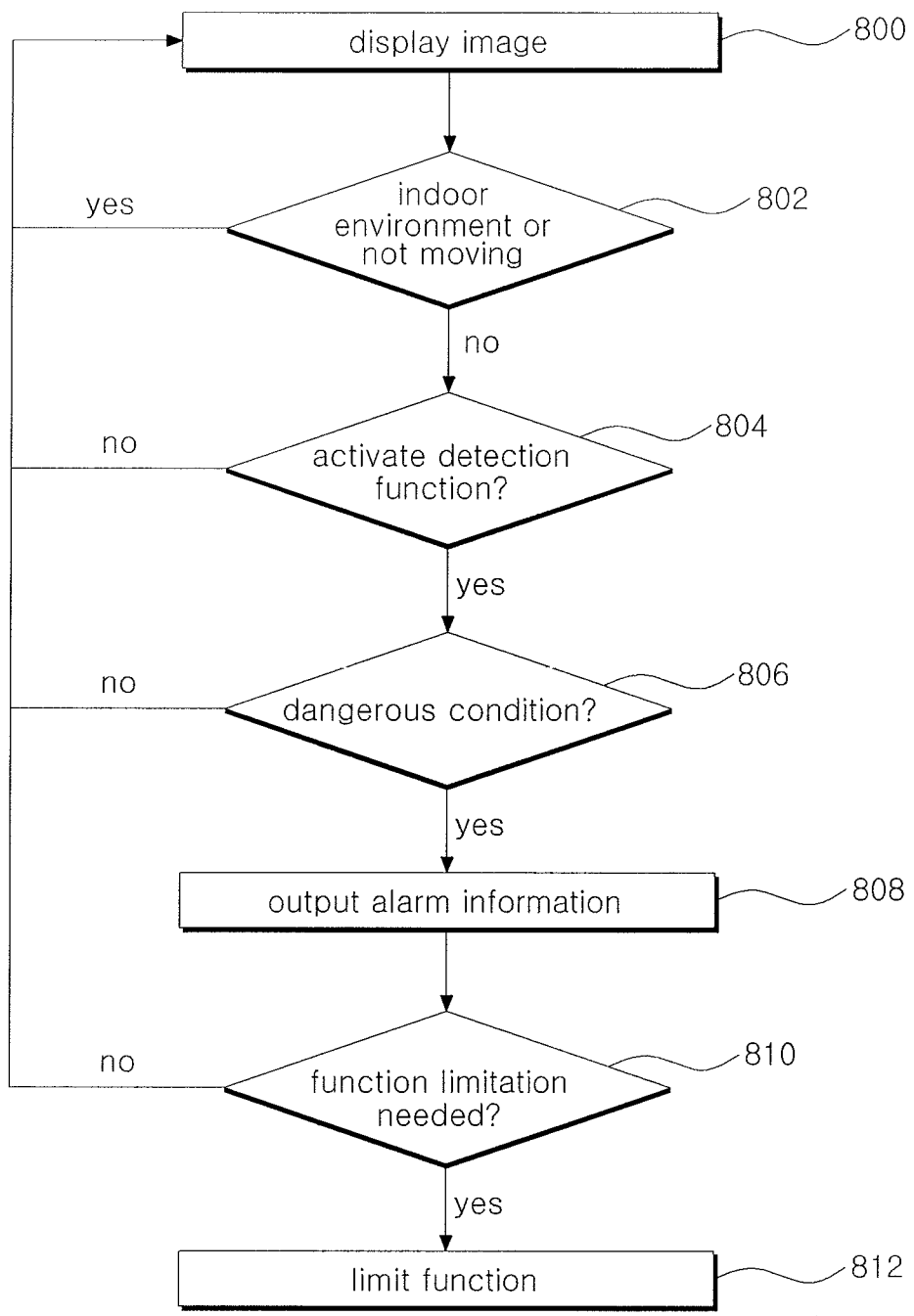
FIG. 8 is a flowchart illustrating the operations of a wearable display device according to an embodiment of the invention.

FIG. 8 is a flowchart illustrating the operations of a wearable display device according to an embodiment of the invention.

Referring to FIG. 8, a wearable display device according to an embodiment of the invention may display an image on the image viewer unit 100 (step 800).

The wearable display device may determine whether or not the user is located in an indoor environment and whether or not the user is moving, by using the information detected by the sensor unit 108 (step 802).

Based on the determined information, it may be determined whether to activate or deactivate the dangerous object detection function (step 804). The dangerous object detection function can be deactivated if the user is located in an indoor environment and is not moving, or can be deactivated if any one condition of being located in an indoor environment and not moving is met.

If the detection function is active, it may be determined whether or not the user faces a dangerous condition (step 806). As described above, the determining of whether or not the user faces a dangerous condition may be based on whether or not a dangerous object exists in the user's surroundings and whether or not the dangerous object is approaching the user.

If it is determined that the user faces a dangerous condition, the wearable display device may output alarm information (step 808). The alarm information may be outputted to be recognizable by the user in video or audio form.

Also, the wearable display device may determine whether or not there is a need to limit functions (step 810). For example, if the dangerous condition is not resolved even after an alarm warning is outputted, the wearable display device can determine that there is a need to limit certain functions.

If it is determined that there is a need to limit a function, the wearable display device may perform a preset function limitation procedure (step 812). The function limitation can be performed by stopping the showing of an image or reducing the image to a preset size or smaller.

Although FIG. 8 illustrates a process in which function limitation is performed after the output of alarm information when it is determined that the function limitation is needed, the output of alarm information and the function limitation can be performed selectively or simultaneously, as already described above.

Figure 9:
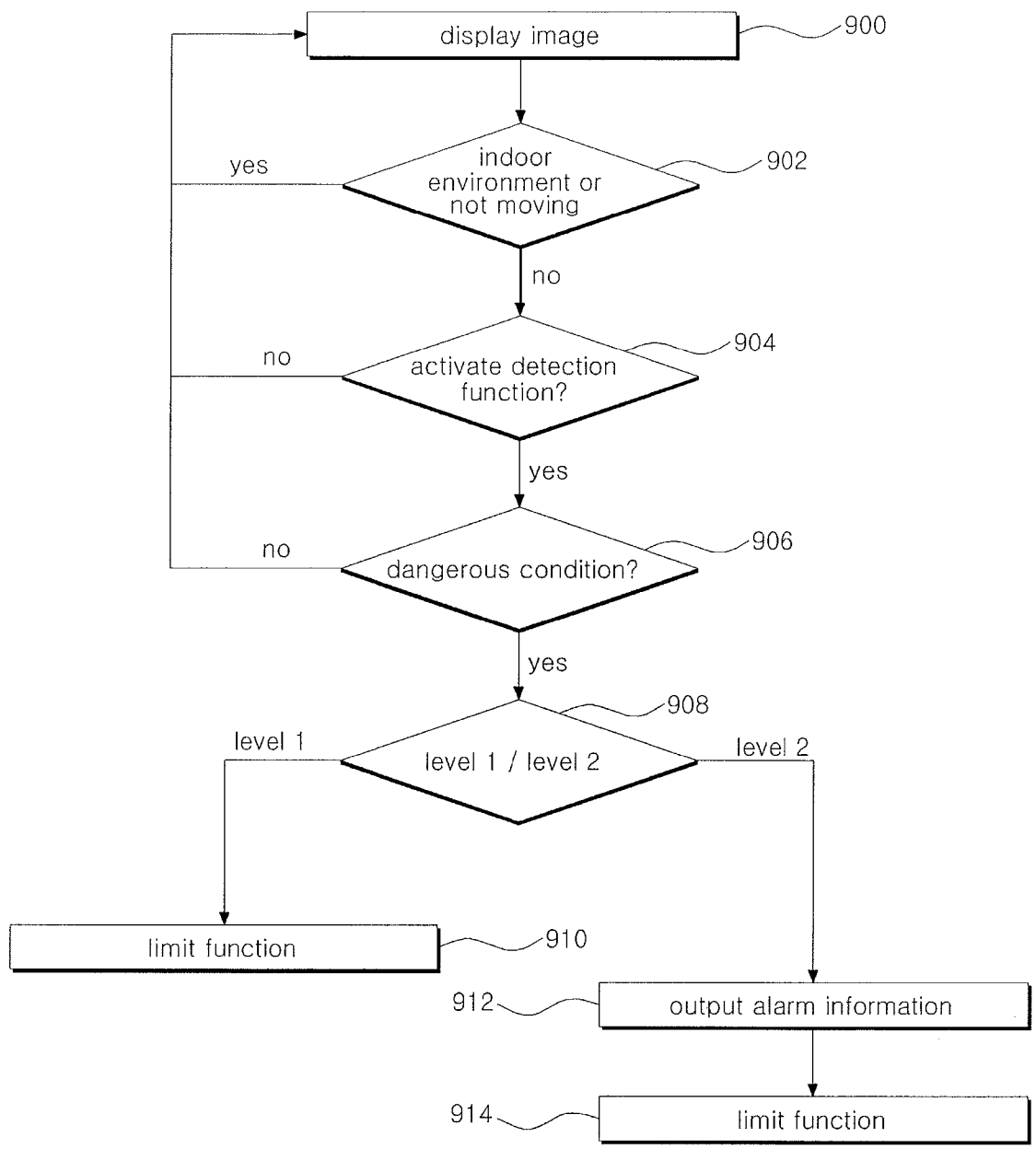
FIG. 9 is a flowchart illustrating the operations of a wearable display device according to another embodiment of the invention.

FIG. 9 is a flowchart illustrating the operations of a wearable display device according to another embodiment of the invention.

Referring to FIG. 9, a wearable display device may display an image on the image viewer unit 100 (step 900).

The wearable display device may determine whether or not the user is located in an indoor environment and whether or not the user is moving, by using the information detected by the sensor unit 108 (step 902).

Based on the determined information, it may be determined whether to activate or deactivate the dangerous object detection function (step 904). Similar to the example shown in FIG. 8, the detection function can be deactivated if the user is located in an indoor environment and is not moving, or can be deactivated if any one condition of being located in an indoor environment and not moving is met.

If the detection function is active, it may be determined whether or not the user faces a dangerous condition (step 906).

Once it is determined that the user faces a dangerous condition, the level of danger may be determined (step 908). Here, the level of danger can be classified into very high (level 1) and high (level 2). That is, it may be determined whether or not the level of danger faced by the user is very high.

If it is determined that the level of danger of the user is very high, the wearable display device may omit the output of alarm information and limit certain functions (step 910).

If it is determined that the level of danger of the user is not very high, the alarm information may be outputted (step 912), similar to the example shown in FIG. 8. If the dangerous condition is not resolved even after outputting the alarm information, so that there is a need to limit certain functions, the functions of the wearable display device may be limited (step 914).

A wearable display device according to an embodiment of the invention can further include an audio part, which may provide information related to a blocked image in audio if it is determined that the user faces a dangerous condition, such as when the movement speed of the user is greater than or equal to a threshold speed, so that the function for showing images is blocked.

For example, while a navigation function is running and guiding the user in image form, if the movement speed of the user exceeds the threshold speed and the image viewer function is limited, the audio part may convert the blocked image, i.e. the information for providing directions, into audio and provide it to the user.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A wearable display device comprising:
an image viewer unit configured to show an image;
a sensor unit configured to acquire a user's surrounding condition information;
a determiner part configured to determine whether or not the user faces a dangerous condition based on information from the sensor unit;
an alarm information output part configured to output alarm information based on a determination result of the determiner part;
a function limiter part configured to deactivate a particular function based on the determination result of the determiner part; and
an audio part,
wherein the function limiter part stops showing the image shown on the image viewer unit or reduces a size of the image to a preset size or smaller, and wherein the audio part provides information related to a blocked image in audio if a function for showing images is limited.

2. The wearable display device of claim 1, wherein the determiner part comprises a dangerous object detector part configured to determine whether or not a dangerous object exists in the user's surroundings.

3. The wearable display device of claim 2, wherein the dangerous object detector part comprises:
an object feature analyzer part configured to determine whether or not a detected object is a dangerous object;
an object velocity analyzer part configured to analyze a velocity of the detected object; and an object direction analyzer part configured to analyze a movement direction of the detected object.

4. The wearable display device of claim 2, wherein the dangerous object detector part further comprises an environment determiner part configured to determine whether or not the user is located indoors.

5. The wearable display device of claim 4, wherein the environment determiner part determines whether or not the user is located indoors by using at least one of illuminance, light wavelength, temperature, GPS reception rate, and presence of a particular radio signal or a combination thereof.

6. The wearable display device of claim 2, wherein the dangerous object detector part is deactivated if the user is located indoors or a movement speed of the user is lower than or equal to a preset threshold speed.

7. The wearable display device of claim 1, wherein the function limiter part deactivates the particular function after the alarm information is outputted if the danger condition is not resolved after a preset amount of time has passed.

8. A wearable display device comprising:
an image viewer unit configured to show an image;
a sensor unit configured to acquire condition information regarding the wearable display device;
a motion detector part configured to detect a movement speed of a user based on information from the sensor unit;
a function limiter part configured to stop showing the image shown on the image viewer unit or reduce a size of the image to a preset size or smaller if the movement speed of the user is greater than or equal to a threshold speed; and
an audio part configured to provide information related to a blocked image in audio if the movement speed of the user is greater than or equal to the threshold speed and a function for showing images is limited.

9. A method of controlling a wearable display device for providing a user with an image, the method comprising:
(a) acquiring the user's surrounding condition information;
(b) determining whether or not the user faces a dangerous condition based on information acquired in said step (a);
(c) outputting alarm information based on a determination result of said step (b); and
(d) deactivating a particular function based on the determination result of said step (b),
wherein said step (d) comprises stopping showing the image or reducing a size of the image to a preset size or smaller; and
wherein information related to a blocked image is provided to the user in audio if a function for showing the image is limited.

10. The method of claim 9, wherein said step (b) comprises determining whether or not a dangerous object exists in the user's surroundings.

11. The method of claim 10, wherein said step (b) comprises determining whether or not the dangerous object exists based on at least one of an object feature, an object velocity, and an object direction.

12. The method of claim 10, wherein said step (b) comprises additionally determining at least one of whether or not the user is located indoors and whether or not the user is moving.

13. The method of claim 12, wherein the function of determining whether or not the dangerous object exists in the user's surroundings is deactivated if it is determined that the user is indoors or a movement speed of the user is lower than or equal to a preset threshold speed.

14. The method of claim 9, wherein said step (d) comprises deactivating the particular function after the alarm information is outputted if the danger condition is not resolved after a preset amount of time has passed.

15. A method of controlling a wearable display device for providing a user with an image, the method comprising:
(a) acquiring the user's surrounding condition information;
(b) determining whether or not the user faces a dangerous condition based on information acquired in said step (a); and
(c) deactivating showing the user the image or reducing a size of the image to a preset size or smaller based on a determination result of said step (b),
wherein information related to a blocked image is provided to the user in audio if a function for showing the image is limited.

* * * * *